(12) United States Patent
Peiffer et al.

(10) Patent No.: US 10,615,663 B2
(45) Date of Patent: Apr. 7, 2020

(54) ELECTRICAL MOTOR COOLING DESIGN

(71) Applicant: DEERE & COMPANY, Moline, IL (US)

(72) Inventors: Jonathan M. Peiffer, Dubuque, IA (US); Robert K. Salamon, New Haven, WI (US)

(73) Assignee: DEERE & COMPANY, Moline, IL (US)

(*) Notice: Subject to any disclaimer, the term of this patent is extended or adjusted under 35 U.S.C. 154(b) by 78 days.

(21) Appl. No.: 15/892,654

(22) Filed: Feb. 9, 2018

(65) Prior Publication Data
US 2019/0252939 A1 Aug. 15, 2019

(51) Int. Cl.
*H02K 5/20* (2006.01)
*H02K 9/19* (2006.01)

(52) U.S. Cl.
CPC .............. *H02K 5/20* (2013.01); *H02K 9/19* (2013.01)

(58) Field of Classification Search
CPC .................................. H02K 5/20; H02K 9/19
USPC .......................................................... 310/54
See application file for complete search history.

(56) References Cited

U.S. PATENT DOCUMENTS

| | | | | |
|---|---|---|---|---|
| 3,681,628 A * | 8/1972 | Krastchew | ............. | H02K 9/005 310/54 |
| 4,190,780 A * | 2/1980 | Whiteley | ................. | H02K 9/19 310/268 |
| 4,216,821 A * | 8/1980 | Robin | ..................... | F22B 1/066 165/11.1 |
| 8,154,158 B2 | 4/2012 | Saban et al. | | |
| 8,963,384 B2 | 2/2015 | Kirkley, Jr. et al. | | |
| 9,397,536 B2 | 7/2016 | Cimatti | | |
| 2004/0124720 A1* | 7/2004 | Condamin | ............... | H02K 5/20 310/51 |
| 2006/0133919 A1* | 6/2006 | Dooley | ..................... | F04D 3/02 415/75 |
| 2007/0152518 A1* | 7/2007 | Perrin | ..................... | H02K 9/22 310/54 |
| 2009/0102298 A1* | 4/2009 | Savant | ..................... | H02K 5/20 310/52 |
| 2010/0005822 A1* | 1/2010 | Bering | ............... | B60H 1/00378 62/239 |
| 2010/0164310 A1* | 7/2010 | Dames | ..................... | H02K 1/32 310/54 |
| 2011/0101802 A1 | 5/2011 | Hennings et al. | | |
| 2014/0062230 A1 | 3/2014 | Mori et al. | | |
| 2014/0111035 A1* | 4/2014 | Gosvener | ............... | H02K 33/18 310/23 |

(Continued)

FOREIGN PATENT DOCUMENTS

EP 0581966 B1 1/1997

*Primary Examiner* — Alex W Mok

(57) ABSTRACT

An electrical machine comprising a rotor; a stator comprising a lamination stack that includes a plurality of laminations aligned coaxially, the lamination stack defining a central bore sized to receive the rotor; and a casing defining a central bore sized to receive the stator, the casing comprising a cooling circuit intended for circulation of a cooling fluid, the cooling circuit comprising an inlet opening for letting cooling fluid in, the inlet opening positioned at the center of a lateral wall of the casing, and a first fluid passage and a second fluid passage originating from the inlet opening, extending from the center of a lateral wall of the casing towards a corresponding end of the casing.

9 Claims, 6 Drawing Sheets

(56) References Cited

U.S. PATENT DOCUMENTS

2014/0175920 A1* 6/2014 Cimatti .................. H02K 5/20
310/54
2016/0294229 A1 10/2016 Volkmuth et al.

* cited by examiner

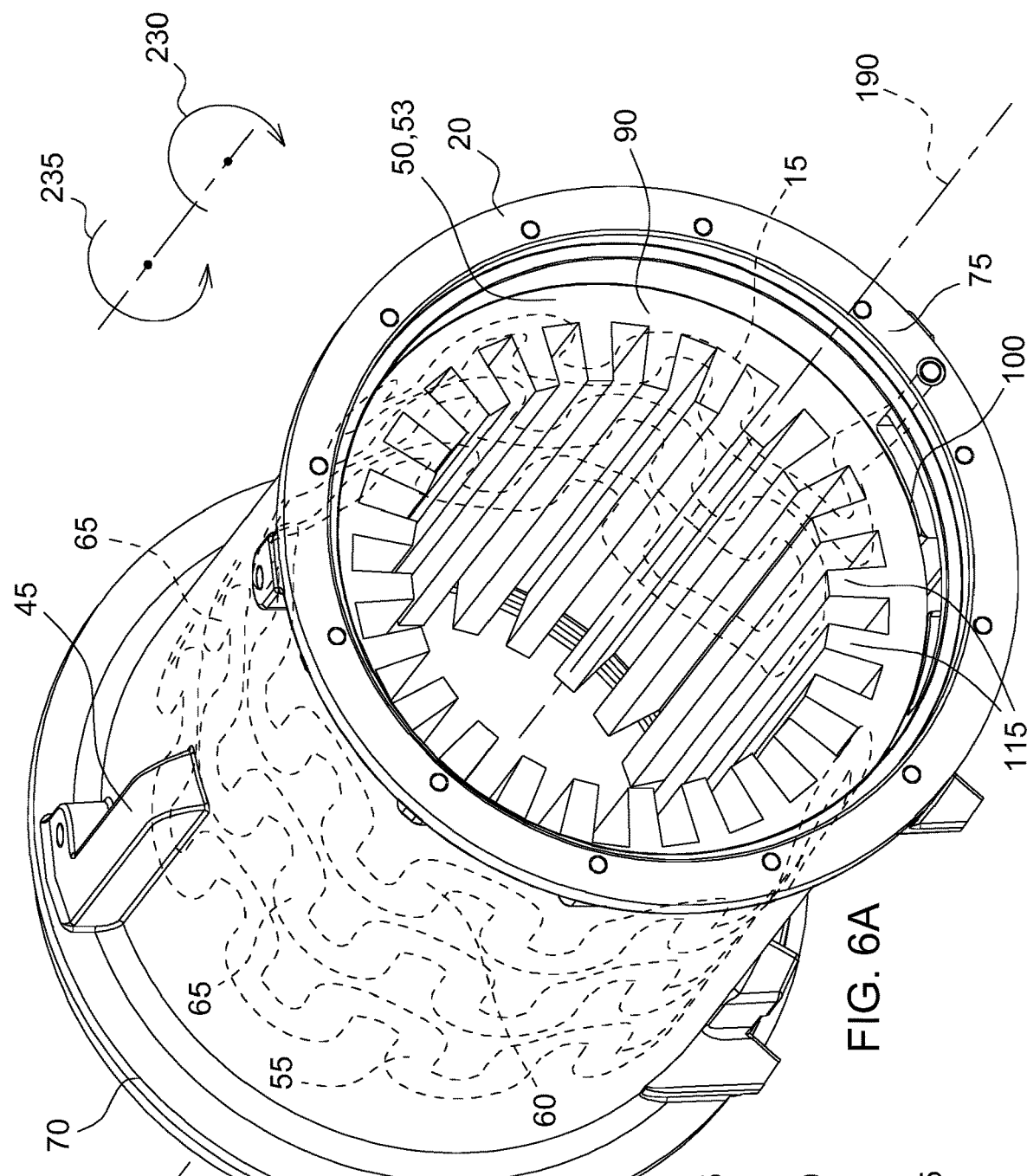
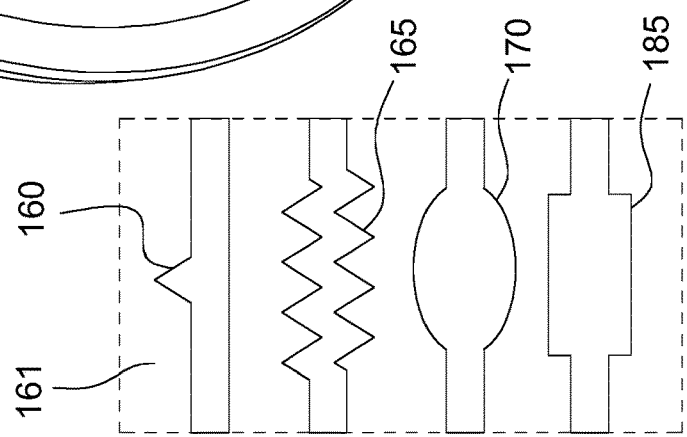
FIG. 6A
FIG. 6B

ELECTRICAL MOTOR COOLING DESIGN

CROSS-REFERENCE TO RELATED APPLICATIONS

N/A

FIELD OF THE DISCLOSURE

The present disclosure relates to a system for cooling an electrical machine. More particularly, the present disclosure relates to a system for cooling stator laminations and coils of the electrical machine.

BACKGROUND

Electrical machines, including motors and generators, operate by rotating a rotor relative to a stator that surrounds the rotor. Electrical machines generate heat during operation that generally flows radially outward from the rotor to the stator to an exterior housing or casing. To cool the electrical machine, air or a liquid coolant may be directed through channels located in the exterior casing.

SUMMARY

This summary is provided to introduce a selection of concepts that are further described below in the detailed description and accompanying drawings. This summary is not intended to identify key or essential features of the appended claims, nor is it intended to be used as an aid in determining the scope of the appended claims.

The present disclosure provides a system for cooling an electrical machine. The electrical machine includes a rotor, a stator, and a casing.

According to one embodiment of the present disclosure, the stator comprises a lamination stack that includes a plurality of laminations aligned coaxially, the lamination stack defining a central bore sized to receive the rotor. The casing defines a central bore sized to receive the stator wherein the casing comprises a cooling circuit intended for circulation of a cooling fluid or air.

The cooling circuit comprises an inlet opening for letting cooling fluid in, the inlet opening positioned at the center of a lateral wall of the casing, and two boustrophedonic spirals originating from the inlet opening, extending from the center of a lateral wall of the casing towards a corresponding end of the casing.

According to an embodiment of the present disclosure, the two boustrophedonic spirals are a substantially mirror-image of each about a plane along a central axis of the central bore.

According to another embodiment of the present disclosure, the two boustrophedonic spirals are a substantially mirror-image of each other about a plane bisecting a central axis of the central bore.

The boustrophedonic spirals comprise a plurality of parallel channels alternating between directional changes towards a first end of the casing and a second end of the casing.

In one embodiment, the plurality of parallel channels coincide with the plurality of laminations.

In another embodiment, at least a portion of a lateral wall of the casing between the plurality of parallel channels interface with a portion of a lateral surface of the lamination stack.

The lateral wall of the casing may provide a support surface for the stator.

The casing may further be non-ferromagnetic.

These and other features will become apparent from the following detailed description and accompanying drawings, wherein various features are shown and described by way of illustration. The present disclosure is capable of other and different configurations and its several details are capable of modification in various other respects, all without departing from the scope of the present disclosure. Accordingly, the detailed description and accompanying drawings are to be regarded as illustrative in nature and not as restrictive or limiting.

BRIEF DESCRIPTION OF THE DRAWINGS

The detailed description of the drawings refers to the accompanying figures in which:

FIG. 1B is a detailed view of stator coils from FIG. 1a.

FIG. 6A is perspective view of an embodiment of a casing and stator assembly.

FIG. 6B is a detailed schematic of alternative embodiments of fluid passages.

DETAILED DESCRIPTION

Figure 1B:
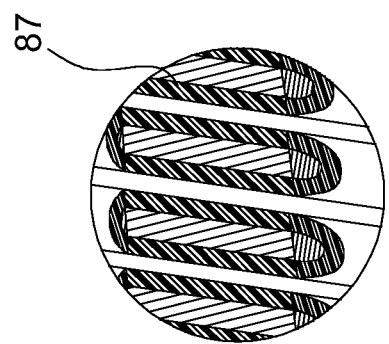

The embodiments disclosed in the above drawings and the following detailed description are not intended to be exhaustive or to limit the disclosure to these embodiments. Rather, there are several variations and modifications which may be made without departing from the scope of the present disclosure.

The present disclosure provides a system for cooling an electrical machine 5 in the form of a motor 80. Although the electrical machine illustrated and described herein is a motor 80, machines of the present disclosure may also include generators, for example. The motor 80 includes a rotor 10, a stator 15, and a casing 20 surrounding stator 15. In operation, power is supplied to motor 80 to rotate rotor 10 relative to the surrounding stator 15.

The casing 20 defines a central bore 35 sized to receive the stator 15 wherein the casing 20 comprises a cooling circuit 40 intended for circulation of a cooling fluid 43. The cooling circuit 40 comprises an inlet opening 45 for letting cooling fluid 43 in, the inlet opening 45 positioned at the center of a lateral wall of the casing 50, and two boustrophedonic spirals 65 originating from the inlet opening 45, extending from the center of a lateral wall 50 of the casing 20 towards a corresponding end of the casing (70, 75).

The cooling fluid 43 may include, for example, oil, water, a mixture of water and ethylene glycol, a mixture of water and propylene glycol, or another suitable heat transfer fluid. Exemplary cooling fluids are capable of removing more from the electrical machine than the air.

Figure 1A:
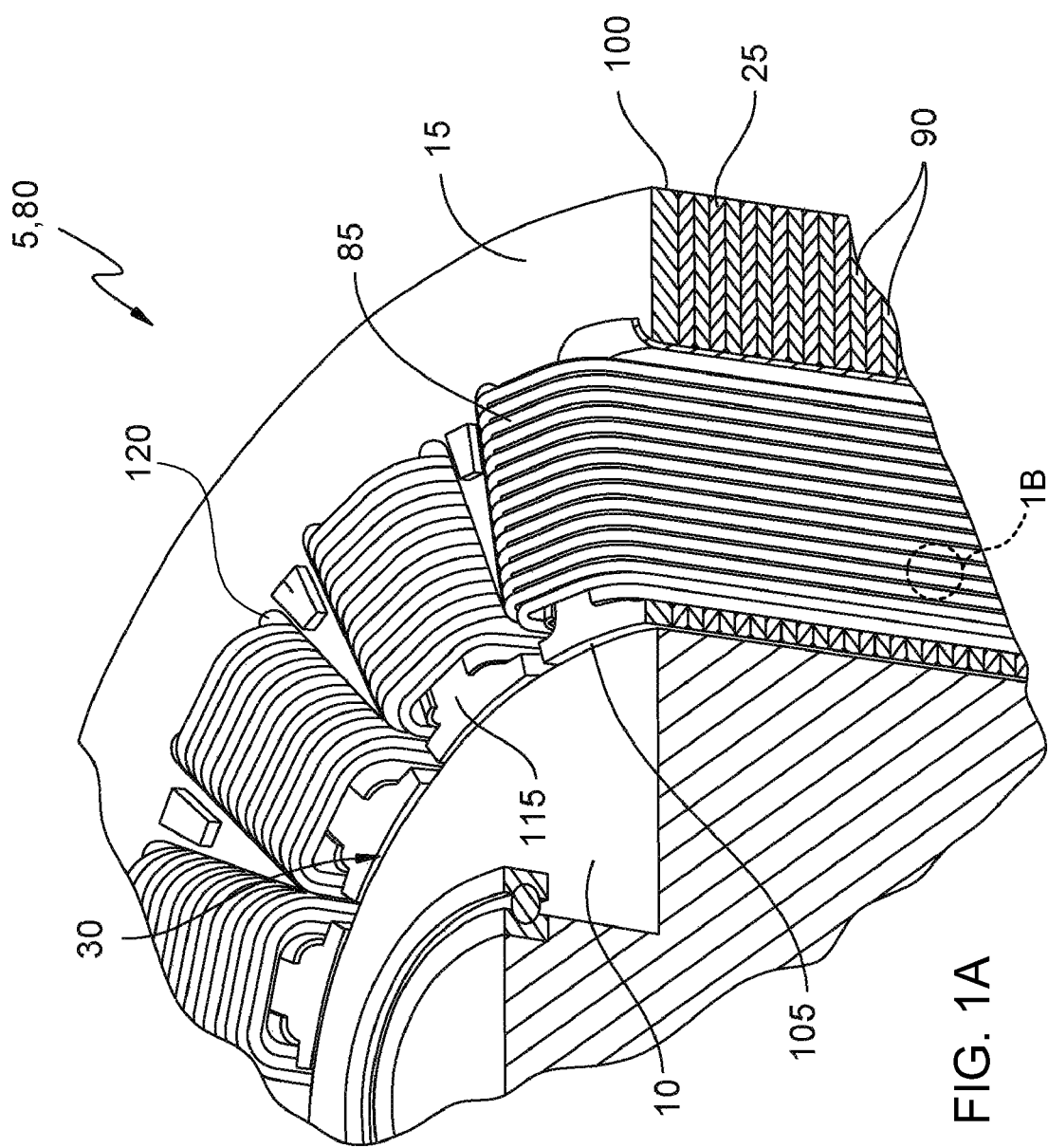
FIG. 1A is a perspective view of an embodiment of a motor including a rotor and a stator.

FIG. 1A is a perspective view of an embodiment of an electrical machine 5 in the form of a motor 80. Motor 80 includes rotor 10, stator 15, and casing 20 (shown in FIGS. 3, 5, and 6A) surrounding stator 15.

Figure 2:
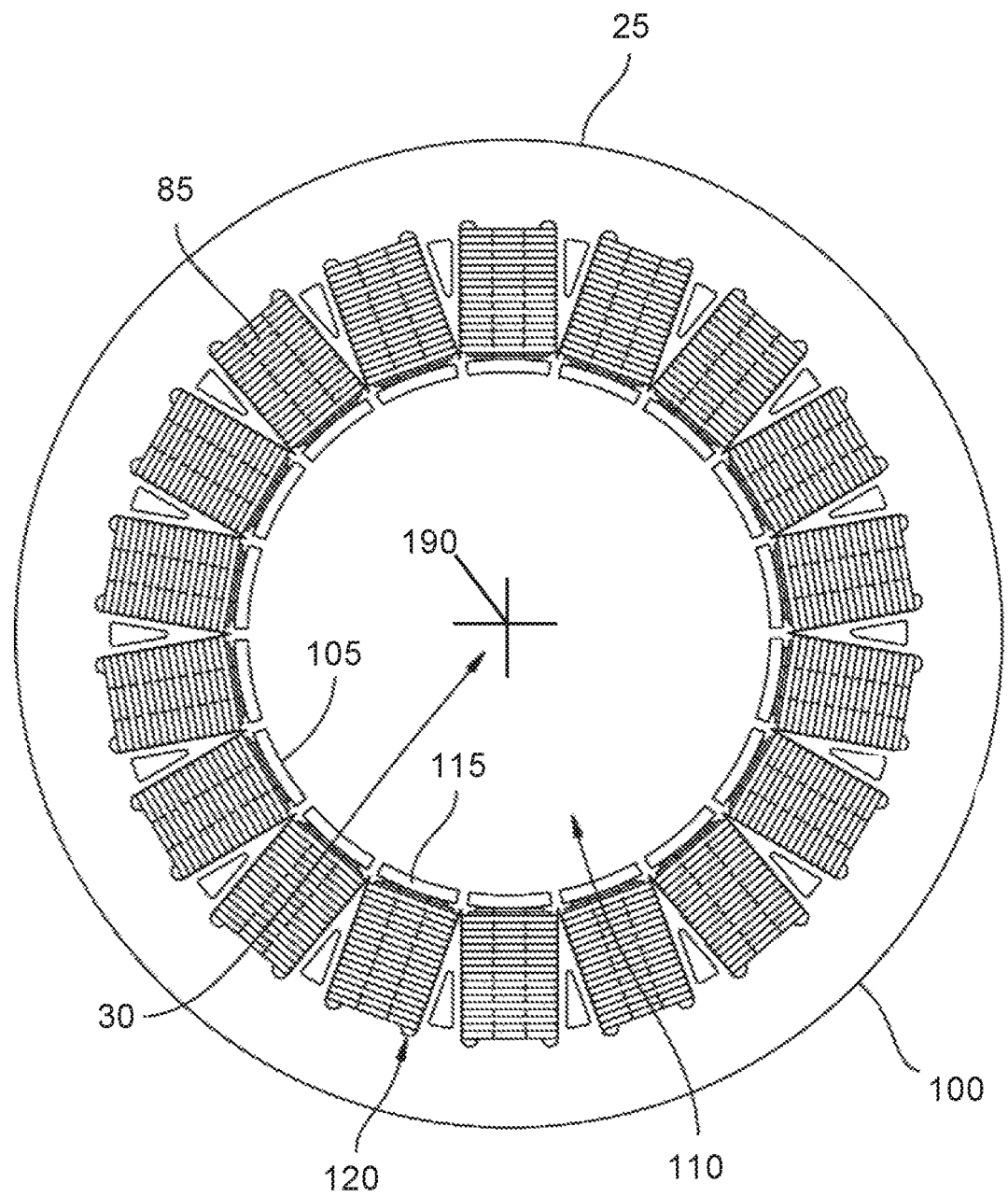
FIG. 2 is a top view of the stator from FIG. 1.

Referring to FIGS. 1A, 1B, and 2, the stator 15 includes a lamination stack 25 and coils 85. Lamination stack 25 includes a plurality of individual laminations 90 secured together and aligned coaxially, the lamination stack 25 defining a central bore 30 sized to receive the rotor 10. The individual laminations 90 may be secured together by welding, with a bonding agent, with a fastening device, or by another suitable technique. Each lamination 90 is a disk-shaped body constructed of electrical steel or another suitable ferromagnetic material. Laminations 90 includes an outer periphery 100 and an inner periphery 105 that defines a central aperture 110. When laminations 90 are layered together, adjacent central apertures 110 align to form a central bore 30 that extends through lamination stack 25. Central bore 30 is sized to receive rotor 10. Inner periphery 105 of laminations 90 also includes a plurality of radially-spaced winding teeth 115. Adjacent winding teeth 115 defining winding slots 120 therebetween. Lamination stacks 25 may extend generally between opposite ends (125, 130 as shown in FIG. 3) of the stator 15 along the central axis 190 (also shown in FIG. 3).

Figure 3:
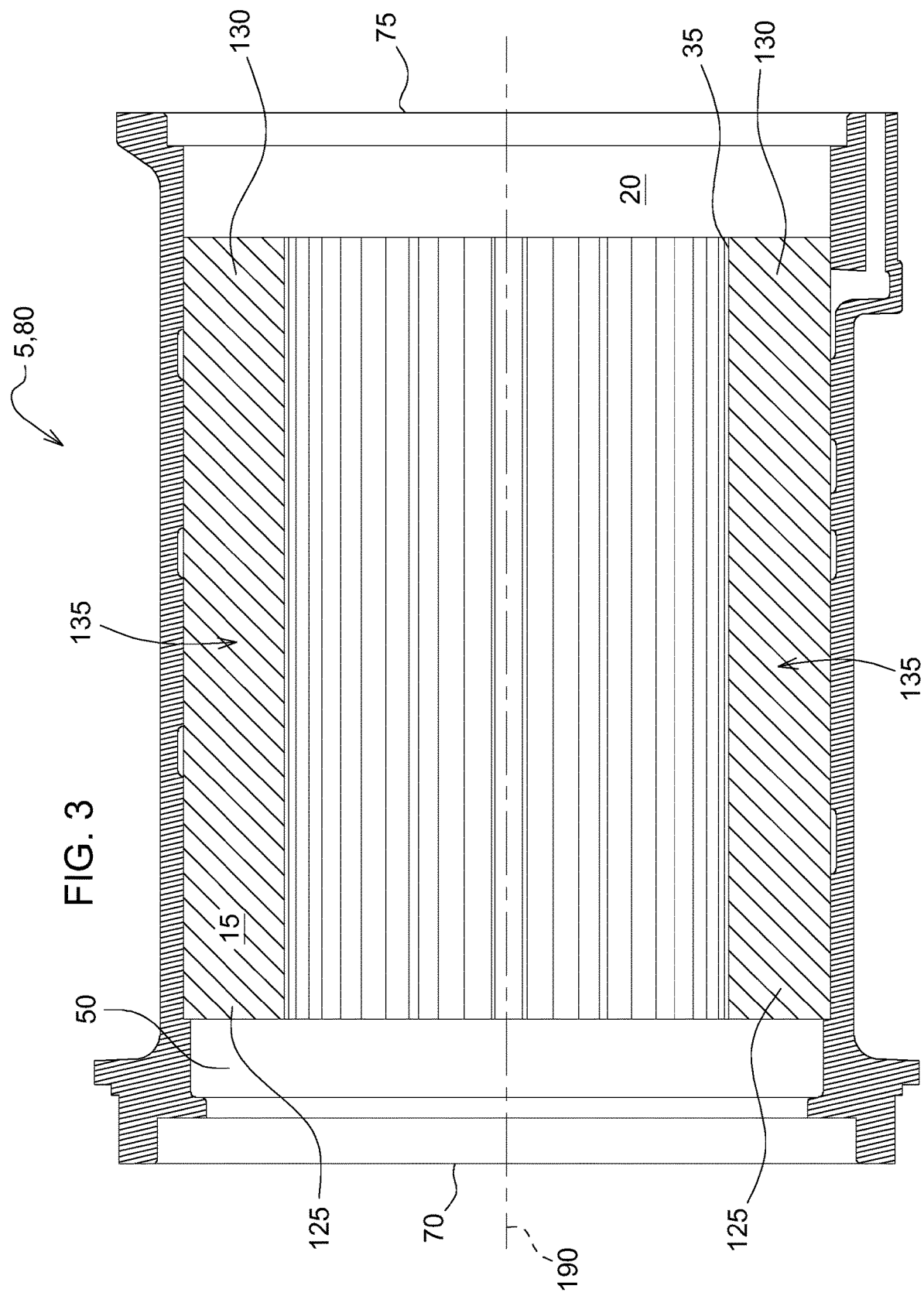
FIG. 3 is a schematic illustration of a cross-section of the stator and casing according to one embodiment.
Figure 4:
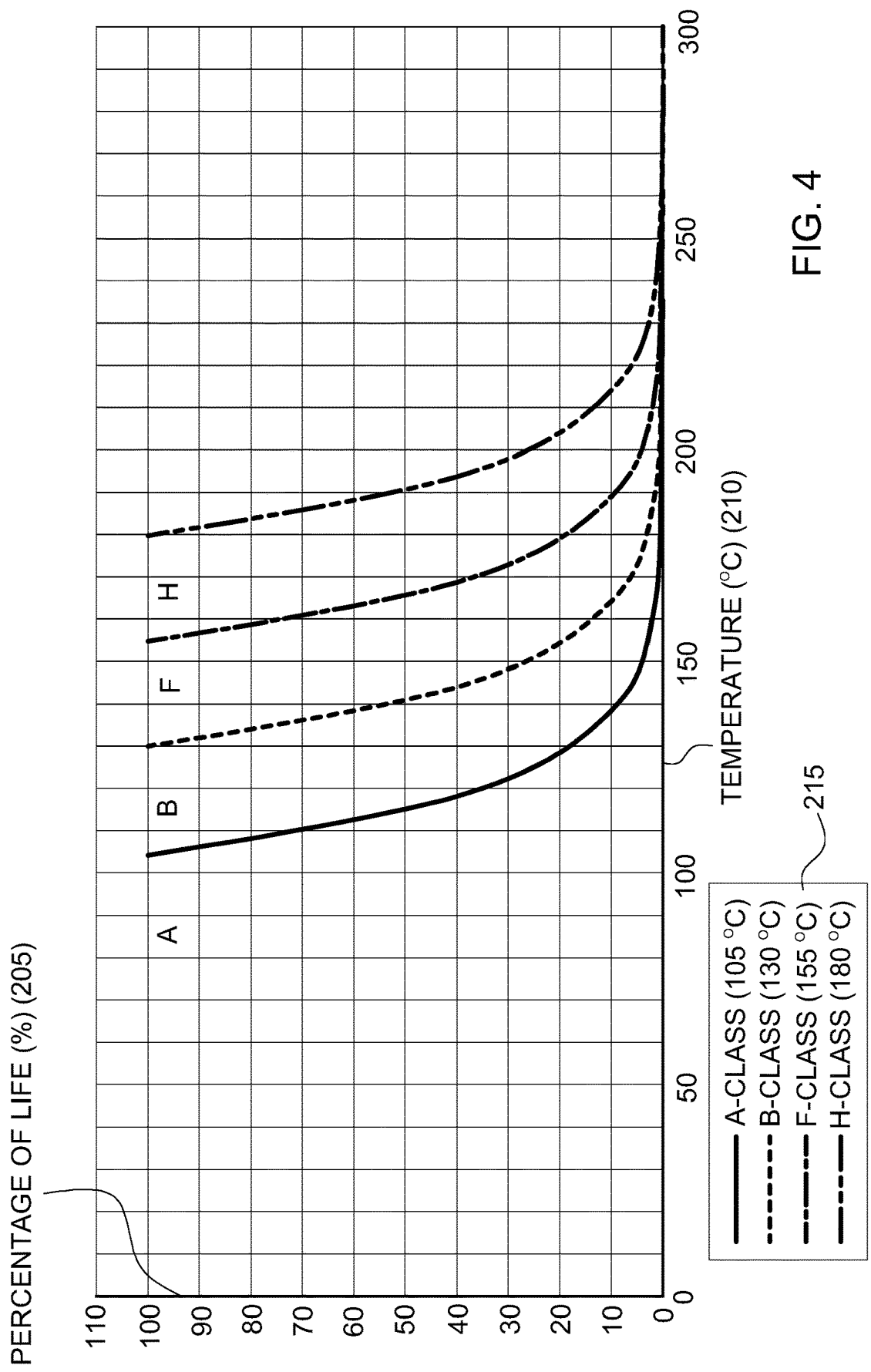
FIG. 4 is a graphical representation on the effects of motor life expectancy versus temperature.

Now turning to FIG. 3, a schematic illustration of a cross-section of the stator 15 and casing 20 assembly is shown. During operation, either as a motor 80 or as a generator, various components in the electrical machine 5 produce heat energy. For example, the coils 85 (as shown in FIG. 1A) are made of a conducting material. Example conducting materials include copper, aluminum, silver, gold, and others. The coils 85 are generally coated in an insulation 87 (shown in FIG. 1B) to confine the path of electrical current in the coils 85. Due to the inherent resistivity of the conducting material, current through the conducting material produces heat during operation. Other components of the electrical machine 5 can also produce heat during operation. For example, friction between moving parts and electrical resistance in other conductive components can also produce heat. It is generally observed that the hottest portion of the stator 15 is the central portion 135. The temperature of the stator 15 gradually decreases as one traverses along the direction of the central axis 190, towards the ends of the stator (125, 130). There exists two predominant types of thermal risks for an overheated electrical machine 5. These include the degradation of stator insulation 87 and the capability of the rotor 10 (i.e. melting may occur if overheated). The stator insulation 87 is the most critical due to its higher voltage and mechanical requirements. The integrity of the stator insulation is a prime factor in reliable motor performance. Deterioration of the stator insulation 87 presents a chemical process governed by the Arrhenius equation. The Arrhenius equation defines the maximum allowable temperature rise above ambient conditions, or the thermal limit of the stator insulation. Although exceeding the thermal limit may not cause immediate stator insulation failure, the stator insulation's expected lifetime decreases. The Arrhenius equation fairly accurately portrays the stator insulation life expectancy degradation wherein an operating temperature increase of approximately ten degrees Celsius in excess of the thermal limit shortens the life of stator insulation by half. FIG. 4 represents the percentage life expectancy 205 along the y-axis versus the approximate temperature 210 for 4 different class insulation categories 215. Incremental increases in temperature demonstrates significant reductions in life expectancies of the motor 80. Therefore, uneven cooling reduces the life expectancy of the stator insulation and therefore the motor, even if a portion of the stator 15 is exposed to excessive heat. In an effort to optimize the life expectancy of a stator 15, and effectively the motor 80, the following casing 20 (shown in FIG. 3 and FIG. 5) comprising the cooling circuit 40 (shown in FIG. 5) described herein advantageously provides improved cooling, a more controlled and even cooling of the stator 15 by directing cooling fluid 43 towards the hottest portion of the stator 15 first (i.e. the central portion 135), and then towards the outer ends of the stator (125, 130). More specifically, the fluid passages (55, 60) of the cooling circuit 40 permit a cooling fluid 43 to remove heat from the stator 15 during operation of the motor 80 in a sequential manner where cooling fluid 43 cools the hottest portions of the stator 15 first. This reduces the risk of overheating any one particular portion of the stator 15 and degradation of any one particular portion of the stator insulation 87 because the life expectancy of the motor 80 can be equated to the life expectancy of the weakest (i.e. most degraded) portion of the stator insulation 87. The casing 20 further provides a stable support surface 53 whereby lamination stacks 25 are supported by the lateral wall 50 of the casing 20, and/or inner wall 145 of the casing 20.

Figure 5:
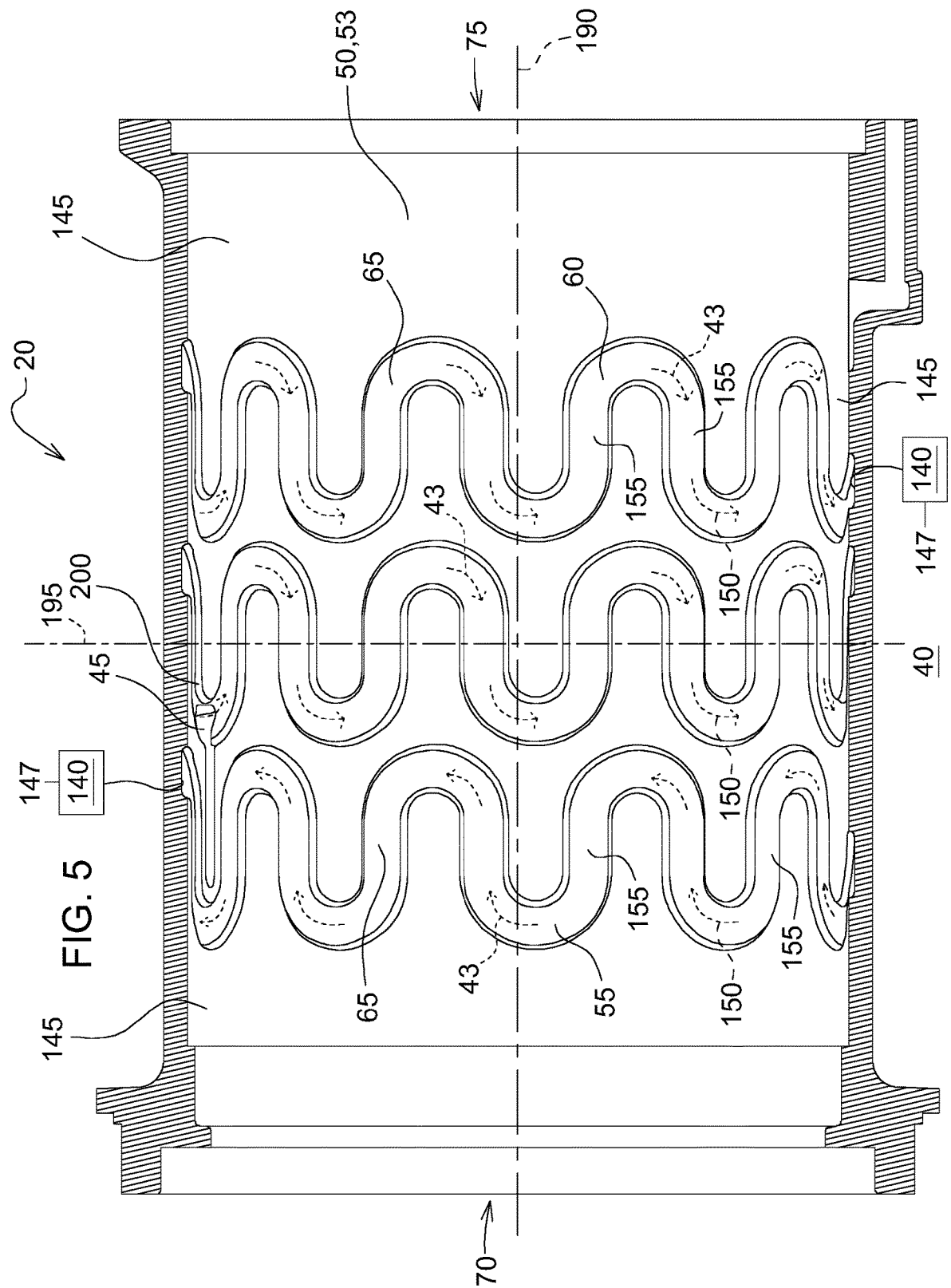
FIG. 5 is a schematic illustration of a cross-section of casing showing directional flow of cooling fluid traveling therein.

Now turning to FIG. 5, the electrical machine comprises a cooling circuit 40 obtained at casing 20 and has a single common inlet opening 45 for the cooling fluid 43, which is axially arranged in the center of the lateral wall 50 of casing 20 (in other words, the common inlet opening 45 is arranged in approximately the center of casing 20 and through the lateral wall 50 of the casing 20). Furthermore, the cooling circuit 40 comprises two collecting chambers 140, each of which forms the end of a corresponding fluid passage (55, 60). In other words, each fluid passage (55, 60) originates centrally from the common inlet opening 45 and ends laterally in a corresponding collecting chamber 140. The common inlet opening 45 is preferably a singular opening. However, alternative embodiments may comprise a wall (not shown) within the common inlet opening 45 to direct flow of the cooling fluid 43 in each respective direction or through each respective fluid passage as described below. Each collecting chamber 140 has at least one corresponding outlet opening 147 of the cooling fluids, through which the cooling fluid 43 is evacuated from the collecting chamber 140 and put back into circulation (i.e. passed through a radiator in order to dispose of some of the heat aspirated from the electrical machine 5, and thus pressurized and re-introduced into the cooling circuit 40 through the common inlet opening 45). The fluid passages (55, 60) permit a cooling fluid 43 in the fluid passages to remove heat from the stator 15 during operation of the motor 80. Direction of flow of the cooling fluid 43 is demonstrated by the dotted arrows (shown in FIG. 5 and FIG. 6A) wherein the cooling fluid 43 enters from common inlet opening 45 and then diverges. Relative to a plane 195 bisecting the central axis 190 of the central bore 30, a first portion of the cooling fluid 43 flows in a clockwise direction through a first fluid passage 55 and a second portion of the cooling fluid 43 flows in a counter-clockwise direction through a second fluid passage 60. Alternatively, the first portion of the cooling fluid 43 may flow in a counter-clockwise direction through the first fluid passage 55 and in a clockwise direction through a second fluid passage 60 in the fluid passages (55, 60) in directions opposite of what is shown. The fluid passages (55, 60) may permit cooling fluid 43 in the fluid passage to contact one or more portions of the outer periphery 100 (shown in FIG. 1, FIG. 2) of the stator 15. The fluid passages (55, 60) comprise a recessed channel 150 along the inner surface 145 of the lateral wall 50 of the casing 20 extending therein. Alternatively, cooling fluid 43 in the fluid passages (55, 60) may be separated from the outer periphery 100 of the stator 15, for example, by a thermally conductive fluid passage wall (not shown), etc. This thermally conductive fluid passage wall would be a physical barrier between the stator 15 and cooling fluid, yet allow for the cooling fluid to draw heat from the stator 15. The central portion of the lateral wall 200 of the casing 20 coincides with the central portion of the stator 135, or generally the hottest portion of the stator 15.

As shown in FIG. 5 and FIG. 6A, the fluid passages (55, 60) may comprise of boustrophedonic spirals 65. The boustrophedonic spirals 65 comprise a plurality of parallel channels 155 alternating between directional changes towards a first end 70 of the casing 20 and a second end 75 of the casing. As shown in FIG. 6A, the plurality of parallel channels 155 may substantially coincide with the plurality of radially-spaced winding teeth 115 wherein the coils 85, the primary heat source when the motor 80 is run, are wound around the teeth 115. More specifically, the plurality of parallel channels 155 coincide with the geometry of the plurality of laminations 90. This further increases the cooling capability as a larger surface area of fluid passages (55, 60) containing the cooling fluid 43 interfaces with the radially-spaced winding teeth 115. Coils 85 (shown in FIG. 1) are wound on teeth 115 wherein electrical current is confined to the coils with insulation 87, thereby another location where heat may also be concentrated. The percentage interface between the fluid passages (55, 60) and the radially-spaced winding teeth 115 may be at least 50%, or in other embodiments 65%, 70%, and 75% respectively.

Now referring to FIG. 6A and FIG. 6B, in alternative embodiments, the fluid passages (55, 60) may have other geometric configurations 161. For example, triangular 160, zig-zag 165, elliptical 170, or rectangular 185 configurations may coincide with a plurality of parallel channels 155, wherein the geometric configurations 161 ascribed alternate between directional changes towards a first end of the casing 70 and the second end of the casing 75. These geometric configurations 161 in the plurality of parallel passages 155 may provide a means for flow disruption to generate turbulence within the fluid passages to encourage mixing of variable cooling fluid temperatures as it moves through the cooling passages (55, 60). The fluid passages may have a symmetric, a non-symmetric configuration, or a substantially symmetric configuration about plane 195 or a plane which coincides with central axis 190.

Furthermore, at least a portion of the inner wall of the casing 145 between the plurality of parallel channels 155 may interface with a portion of the outer periphery 100 of the lamination stack 25. More specifically, the lateral wall of the casing 50 may provide a support surface 53 for the stator 15.

According to an embodiment of the present disclosure as shown in FIG. 6A, the fluid passage comprises two boustrophedonic spirals 65. As shown in FIG. 6, the two boustrophedonic spirals may spiral about the central axis 190 of the central bore (30 or 35). The first boustrophedonic spiral 65 may spiral in a first direction 230, and a second boustrophedonic spiral may spiral in a second direction 235 about the central axis 190. Note the central axis 190 may be the axis of either the central bore sized to receive the rotor 30 or the central bore sized to receive the stator 35.

Using the aforementioned approaches advantageously provides improved cooling of the stator 15 wherein the temperature differential between cooling fluid and stator are greatest near the hottest portions of the stator and wherein the temperature differential between cooling fluid 43 and stator 15 decreases as the temperature of the stator 15 decreases when the motor is run.

The casing may further be non-ferromagnetic, yet thermally conductive to dissipate heat.

In alternative embodiments, the casing may be constructed of a thermally conductive material, such as copper, copper alloy, aluminum, aluminum alloy, or another suitable material, such as steel or steel alloy.

The terminology used herein is for the purpose of describing particular embodiments or implementations and is not intended to be limiting of the disclosure. As used herein, the singular forms "a", "an" and "the" are intended to include the plural forms as well, unless the context clearly indicates otherwise. It will be further understood that the any use of the terms "has," "have," "having," "include," "includes," "including," "comprise," "comprises," "comprising," or the like, in this specification, identifies the presence of stated features, integers, steps, operations, elements, and/or components, but does not preclude the presence or addition of one or more other features, integers, steps, operations, elements, components, and/or groups thereof.

While the above describes example embodiments of the present disclosure, these descriptions should not be viewed in a restrictive or limiting sense. Rather, there are several variations and modifications which may be made without departing from the scope of the appended claims.

What is claimed is:

1. An electrical machine comprising:
   a rotor;
   a stator comprising a lamination stack that includes a plurality of laminations aligned coaxially, the lamination stack defining a central bore sized to receive the rotor; and
   a casing defining a central bore sized to receive the stator, the casing comprising:
      a cooling circuit intended for circulation of a cooling fluid, the cooling circuit comprising an inlet opening for letting cooling fluid in, the inlet opening positioned at the center of a lateral wall of the casing, and a first fluid passage and a second fluid passage originating from the inlet opening, extending from the center of a lateral wall of the casing towards a corresponding end of the casing;
   wherein the first fluid passage and the second fluid passage comprise of boustrophedonic spirals;
   wherein the boustrophedonic spirals comprise a plurality of channels alternating between directional changes towards a first end of the casing and a second end of the casing; and
   wherein the plurality of parallel channels coincide with a plurality of radially-spaced winding teeth.

2. The electrical machine of claim 1, wherein the two boustrophedonic spirals are a substantially mirror-image of each other about a plane along a central axis of the central bore.

3. The electrical machine of claim 1, wherein the two boustrophedonic spirals are a substantially mirror-image of each other about a plane bisecting a central axis of the central bore.

4. The electrical machine of claim 1, wherein at least a portion of a lateral wall of the casing between the plurality of parallel channels interface with a portion of a lateral surface of the lamination stack.

5. The electrical machine of claim 1, wherein at least a portion of the lateral wall of the casing provides a support surface for the stator.

6. The electrical machine of claim 1, wherein the casing is non-ferromagnetic.

7. A casing for an electrical machine comprising a rotor and a stator, the stator comprising a lamination stack that includes a plurality of laminations aligned coaxially, the casing comprising:
- a cooling circuit intended for circulation of a cooling fluid, the cooling circuit comprising an inlet opening for letting cooling fluid in, the inlet opening positioned at the center of a lateral wall of the casing, and two boustrophedonic spirals originating from the inlet opening, extending from the center of a lateral wall of the casing towards a corresponding end of the casing
- wherein the two boustrophedonic spirals comprise a plurality of channels alternating between directional changes towards a first end of the casing and a second end of the casing;
- wherein the plurality of parallel channels coincide with a plurality of radially-spaced winding teeth; and
- wherein at least a portion of a lateral wall of the casing between the plurality of parallel channels interfaces with a portion of an outer periphery of the lamination stack.

8. The casing of claim 7, wherein the casing is non-ferromagnetic.

9. The casing of claim 7, wherein the two boustrophedonic spirals area substantially mirror-image of each other about a plane bisecting a central axis of the central bore.

* * * * *